United States Patent [19]

Russell

[11] 4,371,566

[45] Feb. 1, 1983

[54] ABRASION RESISTANT COATING COMPOSITION

[75] Inventor: Raymond J. Russell, Lincoln Park, N.J.

[73] Assignee: Panelgraphic Corporation, West Caldwell, N.J.

[21] Appl. No.: 185,670

[22] Filed: Sep. 10, 1980

[51] Int. Cl.$^3$ .............................................. B05D 3/06
[52] U.S. Cl. ........................... 427/53.1; 204/159.17; 525/305; 525/308; 427/54.1
[58] Field of Search ....................... 427/54.1, 53.1, 44; 204/159.15, 159.17; 525/59, 57, 305, 308

[56] References Cited

U.S. PATENT DOCUMENTS

| | | | |
|---|---|---|---|
| 3,359,193 | 12/1967 | Pinner | 204/159.17 |
| 3,542,661 | 11/1970 | Klopfer et al. | 204/159.17 |
| 3,557,049 | 1/1971 | Muskat | 525/305 |
| 3,996,394 | 12/1976 | Harris | 204/159.17 |
| 4,273,633 | 6/1981 | Carder et al. | 204/159.17 |
| 4,273,802 | 6/1981 | Kamada et al. | 427/54.1 |

*Primary Examiner*—John H. Newsome
*Attorney, Agent, or Firm*—Ronald G. Goebel

[57] ABSTRACT

Actinic radiation curable coating compositions applicable to many substrates and comprising a pentaerythritol-based polyacrylate or polymethacrylate such as pentaerythritol tetraacrylate, a vinyl chloride-vinyl acetate containing polymer, preferably a partially hydrolyzed vinyl chloride-vinyl acetate copolymer, and a photoinitiator are provided. The compounds are preferably applied to the substrate by spraying a solution of the composition in one or more solvents selected from the group consisting of lower alcohols and ester, ketones having from 3 to 7 carbon atoms and lower alkyl Cellosolves, and removing the solvents. Upon curing in air the compositions form extremely abrasion resistant coatings on the substrate.

73 Claims, No Drawings

ABRASION RESISTANT COATING COMPOSITION

BACKGROUND OF THE INVENTION

This invention relates to radiation curable coating compositions which when cured form highly abrasion resistant coatings for most any substrate.

In the past, many curable or crosslinkable compositions have been developed in the art for use as coatings for clear plastics and the like which when cured offer varying degrees of abrasion and solvent resistance. Among such compositions are fluorocarbon-vinyl ether copolymers crosslinked with polysilicic acid, melamine-formaldehyde coatings, polyurethanes, polysiloxanes, polyalkyls, polyallyldicarbonates, and polyfunctional acrylics. Such coatings have been applied to a wide variety of polymeric substrates including acrylic sheeting, polycarbonates, polyesters and the like. These compositions are generally applied to the substrate by any known method such as dipping, brushing or spraying and are cured at either high temperature or at low temperature in the presence of a catalyst. Ultraviolet curable coatings based on unsaturated polyester resins, including polyacrylics, and containing a photoinitiator have also been described in the art.

The present invention deals with radiation curable coating compositions comprising a pentaerythritol based polyacrylate and methacrylate and a vinyl chloride-vinyl acetate containing polymer which can be applied to a variety of substrates. The coatings before curing coatings are dust-free, level out extremely well on the substrates and are stable against air inhibition of cure such that they can be cured in air hours after application to the substrate. On curing, coatings are formed exhibiting high abrasion resistance, flexibility, weatherability and resistance to thermal stress cracking. Such coatings are additionally scratch resistant and are not attacked by chemical or organic solvents.

SUMMARY OF THE INVENTION

In one embodiment of the present invention a coating composition curable by actinic radiation is provided which can be applied to most any substrate and when cured forms an abrasion-resistant coating on the substrate.

The curable composition preferably comprises a pentaerythritol-based polyacrylate or polymethacrylate, a partially hydrolyzed or modified vinyl chloride-vinyl acetate copolymer and a photoinitiator which can be applied to the substrate by any means known in the art such as by brushing, dipping, spraying or by roller, gravure, spin or flow coating techniques. Spraying is particularly preferred. Solvents such as lower alcohols, lower acetates, ketones and ethylene-glycol alkyl ethers may also be added to the composition to facilitate mixing of the components and to allow efficient and uniform application of the composition to the substrate.

In another embodiment of this invention a method of forming an abrasion resistant coating on a substrate is provided comprising applying the above composition to the substrate to form a coating, removing any solvents from the composition by evaporation and exposing the coating to ultraviolet radiation to effect curing thereof. Post-curing of the coating at elevated temperatures may be conducted to further enhance abrasion resistance.

In other embodiments of the invention a composition comprising the cured product of the above curable composition and a substrate having a coating of the curable composition and the cured product of the curable composition are also provided.

DETAILED DESCRIPTION OF THE PREFERRED EMBODIMENTS

The pentaerythritol-based polyacrylates and polymethacrylates of the curable compositions of this invention include polyacrylates and polymethacrylates of pentaerythritol such as the tri- and tetra-acrylates and methacrylates of pentaerythritol, polyacrylates and methacrylates of di- and tri-pentaerythritols such as dipentaerythritol penta- and hexa-acrylate and dipentaerythritol penta- and hexa-methacrylate and tripentaerythritol octaacrylate and methacrylate as well as mixtures of the above polyacrylates and polymethacrylates. Pentaerythritol tetraacrylate is particularly preferred due to its high performance in imparting abrasion resistance to the final, cured composition.

The preferred vinyl chloride-vinyl acetate containing polymer useful in this invention is a partially hydrolyzed vinyl chloride-vinyl acetate copolymer formed by the hydrolysis of a copolymer of vinyl chloride and vinyl acetate so that part of the acetate groups on the copolymer chain are replaced by hydroxyl groups to form vinyl alcohol. The preparation of such partially hydrolyzed vinyl copolymers is described in U.S. Pat. No. 2,512,726. For use in this invention the partially hydrolyzed vinyl copolymer should contain from about 50% to 95% combined vinyl chloride monomer, from about 2% to about 35% combined vinyl acetate monomer and from about 3% to about 15% combined vinyl alcohol monomer. Particularly preferred is a partially hydrolyzed vinyl chloride-vinyl acetate copolymer containing 91% combined vinyl chloride, 3% combined vinyl acetate and 6% combined vinyl alcohol.

Other vinyl chloride-vinyl acetate containing polymers useful in this invention include vinyl chloride-vinyl acetate copolymers modified with alpha-beta unsaturated olefinic carboxylic acids or epoxy compounds. The carboxylic acid modified vinyl copolymers are prepared by copolymerizing vinyl chloride monomer and vinyl acetate monomer in the presence of small quantities, e.g. up to 10% by weight, of the alpha, beta unsaturated acid or acid derivative in the presence of a catalyst. Exemplary of such acid or acid derivatives are maleic acid, maleic anhydride, monoesters of maleic acid, acrylic acid and methacrylic acid. Such modified vinyl copolymers are described in U.S. Pat. No. 2,329,456.

A vinyl chloride-vinyl acetate copolymer, unmodified and unhydrolyzed, may also be employed in this invention provided it is compatible with other components used in the coating composition, eg. solvents, and additives.

A photoinitiator is added to the composition to initiate crosslinking or curing upon irradiation. Such photoinitiators are well known in the art and include such compounds as benzoin, benzoin methylether, diphenyl disulfide, dibenzyl disulfide, benzil, benzophenone, xanthane, acetophenone, anthraquinone, Michler's ketone and the like. A preferred photoinitiator is alpha-chloroacetyldiphenyloxide. An accelerator such as a tertiary amine may also be added.

It has also been found that small amounts of a peroxide such as benzoyl peroxide may act as a photoinitiator. Such peroxide has the added advantage that it can be used in smaller amounts than the photoinitiators described above and does not tend to discolor or yellow the cured coatings. A combination of photoinitiators may be employed in some cases.

The compositions of the present invention may be applied to the substrate in any conventional manner such as spraying, dipping, brushing or by roller, gravure, spin or flow coating techniques. Spraying is preferred since it allows uniform application of thin cured coatings to the substrate, i.e. on the order of 0.1 to 1.5 mils.

In order to facilitate mixing of the elements of the composition and to allow for efficient spraying, one or more solvents may be employed in the composition, which include lower alcohols having from 1 to 4 carbon atoms such as propanol and butanol; lower alkyl acetates having from 4 to 6 carbon atoms such as propyl and butyl acetate; alkyl ketones having from 3 to 7 carbon atoms such as methyl isoamyl ketone; and ethylene glycol lower alkyl ethers (Cellosolves) such as methyl and ethyl Cellosolve. Organic solvents other than those named above may also be employed provided they are good solvents for the pentaerythritol-based polyacrylate or polymethacrylate and vinyl polymer and do not attack the substrate on which the composition is coated. For example, a quantity of an aromatic solvent such as xylol may also be employed with the above-described solvents to dissolve certain pentaerythritol-based polymethacrylates such as pentaerythritol tetramethacrylate.

The composition may also contain small amounts of flatting agents to lower the gloss of the coating and silicones to increase the flowability of the compositions.

The substrates which can be coated with the curable compositions of this invention are numerous and include any material to which the composition will adhere and coat such as paper, wood, pretreated glass, and metal, rubber and plastics. The compositions are particularly useful for coating polymeric substrates such as polycarbonates, polyvinyls including rigid polyvinyl chloride sheet substrate and substrates comprised of copolymers of polyvinyl chloride and polyvinylacetate, polyacrylics and polyesters. The compositions may be used for the coating of vinyl and polycarbonate substrates used to manufacture low reflection filters for cathode ray tubes (C.R.T.'s) and for acrylic substrates used as front panels for electronic equipment.

Upon curing in air by actinic radiation, the present compositions form a highly abrasion resistant coating even on contoured surfaces which have a lower point of contact with abrasive objects moved along its surface. Tests conducted on cured compositions of this invention coated on polymeric substrates have proved their high resistance to steel wool abrasion. The cured compositions of this invention are also resistant to organic solvents, acids and bases, to thermal stress cracking and are flexible and weatherable. Moreover, clear, cured coatings containing flatting agents made according to the invention are also characterized by their low gloss and high resolution making them ideally suitable for low reflection filters for C.R.T.'s. Clear coatings of this invention may also be applied to clear plastic lenses, meter faces, formed plastic windshields and flat plastic windows used for optical applications to provide abrasion and scratch resistance.

The curable compositions of this invention are prepared by first forming a heavy solution of the vinyl copolymer in one or more solvents, i.e. about 10% to 15% copolymer by weight. A portion of this solution and the pentaerythritol-based polyacrylate or methacrylate is added to a further solvent system to provide a sprayable coating composition which forms a slightly tacky but dust free coating on the substrate after removal of solvents. For example such a sprayable coating composition can be formed using pentaerythritol tetraacrylate and partially hydrolyzed vinyl chloride-vinyl acetate copolymer by adding a portion of a heavy solution of vinyl copolymer in butyl acetate and butanol and pentaerythritol tetraacrylate to a further solvent system comprising propyl acetate, propyl alcohol, methyl Cellosolve and methylisoamyl ketone. The weight ratio of pentaerythritol tetraacrylate to vinyl copolymer in such composition is about 8 to 1. In the case of pentaerythritol-based polymethacrylates such as pentaerythritol tetramethacrylate, an aromatic solvent such as xylol may also be employed in forming the coating composition. This sprayable composition containing such solvents has the advantage that it will not attack most polymeric substrates including polycarbonate substrates. However, such solvents may be varied by those skilled in the art depending on the substrate or the method of application. To this solution is added the photoinitiator in an amount equal to from 1% to 5% of the weight of polyacrylate or methacrylate. If a peroxide such as benzoyl peroxide is employed as a photoinitiator the amount used is generally about 1 weight percent based on the polyacrylate or methacrylate.

The sprayable solution is then preferably sprayed on the substrate using a conventional low pressure spray gun at a wet film thickness of from about 0.9 to 3.0 mils. Thereafter, the solvents are allowed to evaporate either at room temperature for about 10 minutes or at 100° F. to 120° F. for about 2 minutes. Coatings so applied level out well on the substrate, that is form a smooth contiguous film. The dry coating is essentially non-tacky and dust-free. Finally, the dry coating is exposed to actinic radiation to provide a cured coating of from about 0.1 to about 1.5 mil. in dry film thickness.

Actinic radiation as used herein is electromagnetic radiation having a wavelength of 700 nanometers or less which is capable of producing, either directly or indirectly, free radicals in the photoinitiator which in turn cause crosslinking addition polymerization of the compositions. The most commonly used form of actinic light and the preferred form herein is ultraviolet light, that is, electromagnetic radiation having a wavelength in the range of from about 180 nanometers to about 460 nanometers, although actinic light of greater or shorter wavelengths may also be used. Generally, exposures of from about 1 to 5 sec. are sufficient to effect curing of pentaerythritol-based polyacrylate compositions while somewhat longer exposure times are required for the pentaerythritol-based polymethacrylate compositions.

Any suitable source which emits ultraviolet light may be used in curing the compositions of this invention. Particularly preferred are ultraviolet emitting lamps of the medium pressure mercury vapor type having a power rating of 200 watts/inch.

The weight ratio of pentaerythritol-based polyacrylate or methacrylate to vinyl polymer is an important factor in determining the abrasion resistance of the finally cured coatings. Coatings containing too low a ratio of pentaerythritol-based polyacrylate or methacrylate to vinyl polymer i.e., excessive vinyl polymer, tend to lose abrasion resistance in the cured state because of the lack of sufficient amounts of crosslinked polyacrylate or methacrylate. Coatings containing too high a ratio, i.e. insufficient vinyl polymer, tend to lose abrasion resistance in the cured state because of the non-uniform or irregular distribution of the polyacrylate or methacrylate and the inability of the vinyl polymer to prevent air inhibition of the polyacrylate or methacrylate cure which will be discussed further below. Coatings containing no vinyl polymer for example, are not appreciably abrasion resistant, especially as thin films and the thinner the film, the less abrasion resistant such coatings become. Therefore there exists a set of ratio ranges for each type of polyacrylate or polymethacrylate and vinyl polymer above and below which abrasion resistance in the finally cured coatings may decrease significantly or completely.

In the case of compositions containing pentaerythritol-based polyacrylates or methacrylates and a partially hydrolyzed vinyl chloride vinyl acetate copolymer, this ratio should be between about 5 to 1 and about 20 to 1 to achieve abrasion resistance in the cured coatings. High abrasion resistance is achieved at ratios of from about 5 to 1 to about 12 to 1 and optimum abrasion resistance is achieved using a ratio of about 8 to 1. At ratios greater than about 20 to 1 thermal stress cracking may begin to occur in the cured coatings if the temperature is elevated during curing and precured coatings tend to pick up dust and dirt at these levels. This also depends on the type of substrate coated and the film thickness of the coating. Below ratios of about 5 to 1 and above ratios of about 20 to 1, abrasion resistance decreases significantly. Although it is important that the ratio of pentaerythritol-based polyacrylate or methacrylate to partially hydrolyzed vinyl copolymer be maintained in the above ranges, the solvent compositions and amounts may be altered to provide pre-cured coatings or varying consistency as required or desired by those skilled in the art.

The vinyl chloride-vinyl acetate based polymers, particularly the partially hydrolyzed vinyl copolymers, solve many problems associated with coating substrates with thin films, i.e. on the order of 2 to 20 microns, of compositions comprised of radiation curable pentaerythritol-based polyacrylates or methacrylates. Pentaerythritol-based polyacrylates such as pentaerythritol tetraacrylate are low viscosity liquids which when deposited on a substrate do not form uniform coatings, nor do they level out well on the substrate. Pentaerythritol-based polymethacrylates such as pentaerythritol tetramethacrylate are soft, tacky solids and tend to crystallize when coated in solution on the substrate after solvent removal. Moreover, coatings of pentaerythritol-based polyacrylates are wet, tacky and dust attractive. It is also necessary to cure pentaerythritol-based polyacrylate or methacrylate films in an inert atmosphere since the presence of air inhibits their cure. The exclusion of air to enable curing of the polyacrylates or methacrylates is impractical for most commercial coating applications and costly as well. Cured coatings of such polyacrylates are characterized by being brittle, inflexible and subject to cracking in response to heat or stress.

The partially hydrolyzed vinyl chloride-vinyl acetate copolymer increases the viscosity of the pentaerythritol-based polyacrylate thereby allowing the coating to be uniformly deposited and to level out well on the substrate. The vinyl copolymer also inhibits crystallization of the penta erythritol-based polymethacrylates. Secondly, thin films on the order of 2 to 20 microns containing the vinyl copolymers can be deposited on the substrate and dry quickly to a substantially dust free coating. Thirdly, and probably most importantly, is the ability of the vinyl copolymers to substantially eliminate the air inhibition of the polyacrylate or methacrylate cure. Fourthly, cured films containing the copolymer are characterized by being thermal stress crack resistant, flexible, and resistant to weathering.

Thus, compositions according to the present invention can be applied as thin films which readily flow and level out on the substrate, dry rapidly to a dust-free and stable condition such that the films can be cured either immediately or hours later in a few seconds without concern for the elimination of air at any time and form flexible, thermal stress crack-resistant, weatherable, and abrasion resistant coatings.

It has also been found that by post-curing irradiated coatings at temperatures of from about 100° F. to 200° F. at from 2 to 5 hrs., abrasion resistance is even further enhanced.

In order to more completely describe the present invention, the following Examples are given:

EXAMPLE 1

This example illustrates the preparation, application to a substrate and curing of the preferred composition of this invention. The partially hydrolyzed vinyl chloride vinyl acetate copolymer employed in this Example contained about 91% combined vinyl chloride, 3% combined vinyl acetate and 6% combined vinyl alcohol.

A stock solution containing 15 wt. % of the vinyl copolymer was first prepared by dissolving 15 parts by weight (p.b.w.) of the vinyl copolymer in a solvent mixture of 60 p.b.w. butyl acetate and 25 p.b.w. butanol.

A sprayable coating composition was prepared by dissolving a portion of the so-formed stock solution and pentaerythritol tetraacrylate in a further solvent system as shown below.

| Additive | p.b.w. |
|---|---|
| Stock Solution | 50 |
| Pentaerythritol Tetraacrylate | 60 |
| Solvents | |
| Propyl acetate | 90 |
| Propanol | 50 |
| Methyl Cellosolve | 90 |
| Methyl isoamyl ketone | 50 |
| | 390 |

This coating composition contained the following total weight percentages of each component.

| Component | Total wt. % |
|---|---|
| Pentaerythritol tetraacrylate | 15.4 |
| Partially Hydrolyzed Vinyl Copolymer | 1.9 |
| Propyl Acetate | 23.1 |
| Butyl Acetate | 7.7 |
| Propyl Alcohol | 12.8 |
| Butanol | 3.2 |
| Methyl Cellosolve | 23.1 |
| Methyl isoamyl ketone | 12.8 |
| Total | 100 |

To this composition was added about 3.0 p.b.w. of alpha chloroacetyldiphenyloxide to form a UV curable coating composition. This curable composition was then sprayed under low pressure on a polyvinyl chloride substrate (TENNECO CHEM. CO.) at a wet film thickness of about 1.0 mil using a DeVilbiss-TYPE EGA spray gun and allowed to dry in air at room temperature. The composition leveled out well on the substrate. Upon drying the film thickness was about 0.3 mil. and was dust-free. The polyvinylchloride substrate coated with the curable mixture was then irradiated with high intensity UV light for about 2 sec. to effect curing. The composition could be left on the substrate for hours before UV curing without air inhibition of cure. In a similar manner a polycarbonate substrate and an acrylic substrate were each coated with the above curable composition, dried to remove solvents and irradiated with UV light for about 3 sec.

EXAMPLE 2

This Example demonstrates the resistance to steel wool abrasion of a cured composition according to this invention on polymeric substrates and compared to substrates coated with other materials and uncoated substrates.

In this Example, each substrate coated with the cured composition of Example 1 was subjected to abrasion by rubbing with a ½ inch block of aluminum covered with ⅛ inch thick 0000 steel wool under a 1000 g. load. After each double rub (1 back and forth stroke) the coating was observed for visible scratches. As comparison samples, the following were also tested:

A polyvinyl substrate coated with a vinyl urethane composition (VINYL URETHANE);

A vinyl substrate coated with a composition comprising a vinyl chloride-vinyl acetate-vinyl alcohol terpolymer and melamine (VINYL MELAMINE);

An acrylic substrate coated with a nitrocellulose-aliphatic urethane coating (ALIPHATIC URETHANE); and An uncoated polyvinyl chloride substrate;
An uncoated polycarbonate substrate; and
An uncoated acrylic substrate.

It was found that all substrates coated with the Example 1 coating were resistant to steel wool abrasion after 1000 double rubs. The VINYL URETHANE, VINYL MELAMINE, and ALIPHATIC URETHANE coated substrates developed numerous visible scratches after 2 or 3 double rubs. The uncoated polyvinyl chloride, polycarbonate and acrylic substrates developed numerous scratches after 1 double rub.

EXAMPLE 3

In this Example, the procedure of Example 1 was followed except that the stock solution of copolymer was eliminated and the curable composition formed after removal of solvents essentially comprised pentaerythritol tetraacrylate and the photoinitiator. After removal of solvents the coating was wet, tacky and easily picked up dust. After irradiating the composition with UV light for about 5 sec. in air the coating was hard and brittle and it was found that stroking the coating with steel wool only a few times produced abrasion. This was attributed to air inhibition of the polyacrylate cure which inhibition is substantially eliminated by the use of the partially hydrolyzed vinyl chloride-vinyl acetate copolymer as demonstrated in the foregoing Examples.

EXAMPLE 4

In this Example, the sprayable composition of Example 1 was sprayed on an acrylic substrate, dried to remove solvents and irradiated with UV light to effect crosslinking according to Example 1. The dry film thickness of the cured coating was about 0.4 mil. The cured, coated acrylic substrate was then post-cured by heating it in an oven at 150° F. for about 4 hours. The post-cured coated substrate was subjected to the steel wool abrasion test of Example 2 using a more abrasive steel wool grade, #1 steel wool. After approximately 1000 double rubs there were still no visible scratches on the coating.

EXAMPLE 5

In this Example, the procedure of Example 1 was followed using benzoyl peroxide as a photoinitiator instead of alpha-chloroacetyldiphenyloxide at a level of 1 weight percent based on the weight of pentaerythritol tetraacrylate. The composition was coated and cured on an acrylic substrate at a dry film thickness of about 0.3 mil. Steel wool abrasion resistance according to the procedure of Example 2 was as good as any of the Ex. 1 coated substrates.

EXAMPLE 6

In this Example, the procedure of Example 1 was followed except that a partially hydrolyzed vinyl chloride-vinyl acetate copolymer containing 58% vinyl chloride 34% vinyl acetate and 8% vinyl alcohol was substituted for the vinyl copolymer used in Example 1. The coating composition formed using this procedure was sprayed on an acrylic substrate. The resulting cured coating was subjected to the steel wool abrasion test as set forth in Example 2. It was found that such coating was resistant to steel wool abrasion for up to about 50 double rubs.

EXAMPLE 7

The Example 1 coating on an acrylic substrate was contacted separately with an aqueous sodium hydroxide solution, methylene chloride and acetone for about 15 minutes. It was found that these reagents had no effect on the coating.

I claim:

1. A composition curable by actinic radiation to form an abrasion-resistant product comprising a pentaerythritol-based polyacrylate or polymethacrylate, a vinyl chloride-vinyl acetate containing polymer and a photoinitiator, wherein the weight ratio of said polyacrylate or polymethacrylate to said vinyl chloride-vinyl acetate containing polymer is from about 5 to 1 to about 20 to 1.

2. The composition of claim 1 wherein said pentaerythritol-based polyacrylate is selected from the group consisting of pentaerythritol triacrylate, pentaerythritol tetraacrylate, dipentaerythritol hexaacrylate, dipentaerythritol pentaacrylate, tripentaerythritol octaacrylate and mixtures thereof.

3. The composition of claim 1 wherein said pentaerythritol-based polyacrylate is pentaerythritol tetraacrylate.

4. The composition of claim 1 wherein said pentaerythritol based polymethacrylate is selected from the group consisting of pentaerythritol trimethacrylate, pentaerythritol tetramethacrylate, dipentaerythritol hexamethacrylate, dipentaerythritol pentamethacrylate, tripentaerythritol octamethacrylate and mixtures thereof.

5. A composition curable by actinic radiation to form an abrasion resistant product comprising a pentaerythritol based polyacrylate or polymethacrylate, a partially hydrolyzed vinyl chloride-vinyl acetate copolymer containing from about 50% to 95% vinyl chloride, from about 2% to 35% combined vinyl acetate monomer and from about 3% to 15% combined vinyl alcohol monomer and a photoinitiator.

6. The composition of claim 5 wherein said copolymer contains about 91% combined vinyl chloride monomer, about 3% combined vinyl acetate monomer and about 6% vinyl alcohol monomer.

7. The composition of claim 5 wherein said copolymer contains about 58% combined vinyl chloride monomer, 34% combined vinyl acetate monomer and about 8% combined vinyl alcohol monomer.

8. The composition of claim 1 wherein said polymer is a vinyl chloride-vinyl acetate copolymer modified with an alpha, beta, unsaturated acid or derivative thereof.

9. A composition curable by actinic radiation to form an abrasion resistant product comprising a pentaerythritol based polyacrylate or polymethacrylate, a vinyl chloride-vinyl acetate copolymer modified with an epoxy compound and a photoinitiator.

10. The composition of claim 1 wherein said photoinitiator is alphachloroacetyldiphenyloxide.

11. The composition of claim 1 wherein said photoinitiator is benzoyl peroxide.

12. The composition of claim 1 which further comprises at least one solvent selected from the group consisting of lower alcohols, lower alkyl acetates, alkyl ketones having from 3 to 7 carbon atoms and ethylene glycol lower alkyl ethers.

13. A composition curable by actinic radiation to form an abrasion resistant product comprising a pentaerythritol-based polyacrylate or polymethacrylate, a partially hydrolyzed vinyl chloride vinyl acetate copolymer containing from about 50% to 95% combined vinyl chloride monomer, from about 2% to 35% combined vinyl acetate monomer and from about 3% to 15% combined vinyl alcohol and a photoinitiator, wherein the weight ratio of said polyacrylate or methacrylate to said copolymer is from about 5 to 1 to about 20 to 1.

14. The composition of claim 13 wherein said copolymer contains about 91% combined vinyl chloride monomer, 3% combined vinyl acetate monomer and about 6% combined vinyl alcohol.

15. The composition of claim 13 wherein said copolymer contains about 58% combined vinyl chloride, 34% combined vinyl acetate and 8% combined vinyl alcohol.

16. The composition of claim 13 wherein said photoinitiator is alpha chloroacetyldiphenyloxide.

17. The composition of claim 13 wherein said photoinitiator is benzoyl peroxide.

18. The composition of claim 13 which further comprises at least one solvent selected from the group consisting of lower alcohols, lower alkyl acetates, alkyl ketones having from 3 to 7 carbon atoms and ethylene glycol lower alkyl ethers.

19. The composition of claim 13 wherein said weight ratio is from about 5 to 1 to about 10 to 1.

20. The composition of claim 13 wherein said weight ratio is about 8:1.

21. The composition of claim 13 wherein said pentaerythritol-based polyacrylate is pentaerythritol tetraacrylate.

22. A composition curable by actinic radiation to form an abrasion resistant product comprising pentaerythritol tetraacrylate, a partially hydrolyzed vinyl chloride-vinyl acetate copolymer containing about 91% combined vinyl chloride monomer, 3% combined vinyl acetate monomer and about 6% combined vinyl alcohol and a photoinitiator wherein the weight ratio of said tetraacrylate to said copolymer is from about 5 to 1 to 20 to 1.

23. A composition curable by actinic radiation to form an abrasion resistant product comprising pentaerythritol tetraacrylate, a partially hydrolyzed vinyl chloride-vinyl acetate copolymer containing about 58% combined vinyl chloride, 34% combined vinyl acetate and 8% combined vinyl alcohol, and a photoinitiator wherein the weight ratio of said tetraacrylate to said copolymer is from about 5 to 1 to 20 to 1.

24. A product comprising the cured composition of claim 1.

25. A product comprising the cured composition of claim 3.

26. A product comprising the cured composition of claim 5.

27. A product comprising the cured composition of claim 6.

28. A product comprising the cured composition of claim 7.

29. A product comprising the cured composition of claim 13.

30. A product comprising the cured composition of claim 22.

31. A product comprising the cured composition of claim 23.

32. An abrasion-resistant product comprising a substrate having coated thereon the cured composition of claim 1.

33. The product of claim 32 wherein said substrate is a polymeric material selected from the group consisting of polyacrylics, polyvinyls, polycarbonates and polyesters.

34. An abrasion resistant product comprising a substrate having coated thereon the cured composition of claim 13.

35. The product of claim 34 wherein said substrate is a polymeric material selected from the group consisting of polyvinyls, polyacrylics, polycarbonates and polyesters.

36. An abrasion resistant product comprising a substrate having coated thereon the cured composition of claim 22.

37. The product of claim 36 wherein said substrate is a polymeric material selected from the group consisting of polyvinyls, polyacrylics, polycarbonate and polyesters.

38. A method of providing an abrasion resistant coating on a substrate comprising:
(a) forming a composition curable by actinic radiation comprising a pentaerythritol-based polyacrylate or polymethacrylate, a vinyl chloride-vinyl acetate containing polymer and a photoinitiator wherein the weight ratio of said pentaerythritol-based polyacrylate or polymethacrylate to said vinyl chloride-vinyl acetate containing polymer is formed about 5 to 1 to about 20 to 1;
(b) applying said composition to said substrate; and
(c) irradiating said composition with actinic radiation to effect curing thereof.

39. The method of claim 38 wherein said pentaerythritol-based polyacrylate is selected from the group consisting of pentaerythritol triacrylate, pentaerythritol tetraacrylate, dipentaerythritol pentaacrylate, dipentaerythritol hexaacrylate tripentaerythritol octaacrylate and mixtures thereof.

40. The method of claim 38 wherein said pentaerythritol-based polyacrylate is pentaerythritol tetraacrylate.

41. A method of providing an abrasion resistant coating on a substrate comprising:
(a) forming a composition curable by actinic radiation comprising a pentaerythritol-based polyacrylate or polymethacrylate, a partially hydrolyzed vinyl chloride-vinyl acetate copolymer containing from about 50% to 95% combined vinyl chloride, from about 2% to 25% combined vinyl acetate monomer and from about 3% to 15% combined vinyl alcohol monomer;
(b) applying said composition to said substrate; and
(c) irradiating said composition with actinic radiation to effect curing thereof.

42. The method of claim 41 wherein said copolymer contains about 91% combined vinyl chloride monomer, about 3% combined vinyl acetate monomer and about 6% vinyl alcohol monomer.

43. The method of claim 41 wherein said copolymer contains about 58% combined vinyl chloride monomer, 34% combined vinyl acetate monomer and about 8% combined vinyl alcohol monomer.

44. The method of claim 38 wherein said polymer is a vinyl chloride-vinyl acetate copolymer modified with an alpha, beta unsaturated acid or derivative thereof.

45. A method of providing an abrasion resistant coating on a substrate comprising:
(a) forming a composition curable by actinic radiation comprising a pentaerythritol-based polyacrylate or polymethacrylate, a vinyl chloride-vinyl acetate copolymer modified with an epoxy compound and a photoinitiator;
(b) applying said composition to said substrate; and
(c) irradiating said composition with actinic radiation to effect curing thereof.

46. The method of claim 38 wherein said photoinitiator is alpha chloroacetyldiphenyloxide.

47. The method of claim 38 wherein said photoinitiator is benzoyl peroxide.

48. The method of claim 38 wherein said composition is applied by spraying.

49. The method of claim 38 wherein said substrate is a polymeric material selected from the group consisting of polyacrylics, polyvinyls, polycarbonates and polyesters.

50. A method of providing an abrasion resistant coating on a substrate comprising;
(a) forming a composition curable by actinic radiation comprising a pentaerythritol-based polyacrylate or methacrylate, a partially hydrolyzed vinyl chloride-vinyl acetate copolymer containing from about 50% to 95% combined vinyl chloride, from abut 2% to 35% combined vinyl acetate monomer and from about 3% to 15% combined vinyl alcohol monomer and a photoinitiator, wherein the weight ratio of said acrylate or methacrylate to said copolymer is from about 5 to 1 to about 20 to 1;
(b) applying said composition to said substrate; and
(c) irradiating said composition with actinic radiation to effect curing thereof.

51. The method of claim 50 wherein said copolymer contains about 91% combined vinyl chloride monomer, about 3% combined vinyl acetate monomer and about 6% vinyl alcohol monomer.

52. The method of claim 50 wherein said copolymer contains about 58% combined vinyl chloride monomer, 34% combined vinyl acetate monomer and about 8% combined vinyl alcohol monomer.

53. The method of claim 50 wherein said photoinitiator is alpha chloroacetyldiphenyloxide.

54. The method of claim 50 wherein said photoinitiator is benzoyl peroxide.

55. The method of claim 50 wherein said composition is applied by spraying.

56. The method of claim 50 wherein said substrate is a polymeric material selected from the group consisting of polyacrylics, polyvinyls, polycarbonates and polyesters.

57. The method of claim 50 wherein the weight ratio of said pentaerythritol-based polyacrylate or methacrylate to said copolymer is from about 5 to 1 to 12 to 1.

58. The method of claim 50 wherein the weight ratio of said pentaerythritol-based polyacrylate or methacrylate to said copolymer is about 8 to 1.

59. The method of claim 50 which further comprises postcuring said cured coating at elevated temperatures.

60. A method of providing an abrasion resistant coating on a polymeric substrate comprising:
(a) forming a solution of pentaerythritol tetraacrylate, a copolymer containing about 91% combined vinyl chloride monomer, about 3% combined vinyl acetate monomer and about 6% vinyl alcohol monomer and a photoinitiator in at least one solvent selected from the group consisting of lower alcohols, lower alkyl acetates, alkyl ketones having from 3 to 7 carbon atoms and ethylene glycol lower alkyl ethers; wherein the weight ratio of said tetraacrylate to said copolymer is from about 5 to 1 to about 20 to 1;
(b) spraying said solution on said substrate;
(c) removing said at least one solvent; and
(d) irradiating said coating with ultraviolet radiation to effect curing thereof.

61. The method of claim 60 wherein said polymeric substrate is selected from the group consisting of polyvinyl, polyacrylics, polycarbonates and polyesters.

62. The method of claim 60 wherein said weight ratio is from about 5 to 1 to about 12 to 1.

63. The method of claim 60 wherein said weight ratio is about 8 to 1.

64. A product comprising a substrate having coated thereon the composition of claim 1.

65. A product comprising a substrate having coated thereon the composition of claim 3.

66. A product comprising a substrate having coated thereon the composition of claim 5.

67. A product comprising a substrate having coated thereon the composition of claim 13.

68. A product comprising a substrate having coated thereon the composition of claim 16.

69. A product comprising a substrate having coated thereon the composition of claim 22.

70. A product comprising a substrate having coated thereon the composition of claim 23.

71. The method of claim 60 which further comprises postcuring said coating at temperatures of from between 100° F. and 150° F. for from 2 to 5 hours.

72. The method of claim 60 wherein said photoinitiator is alpha chloroacetyldiphenyloxide.

73. The method of claim 60 wherein said photoinitiator is benzoyl peroxide.

* * * * *